US007746809B2

(12) United States Patent
Yan (10) Patent No.: US 7,746,809 B2
(45) Date of Patent: Jun. 29, 2010

(54) METHOD FOR MAKING CORRESPONDENCE BETWEEN A MAINTENANCE POINT IDENTIFIER AND A MEDIA ACCESS CONTROL ADDRESS

(75) Inventor: Zhiyong Yan, Shenzhen (CN)

(73) Assignee: Huawei Technologies Co., Ltd., Guangdong Province (CN)

( * ) Notice: Subject to any disclaimer, the term of this patent is extended or adjusted under 35 U.S.C. 154(b) by 143 days.

(21) Appl. No.: 11/791,908

(22) PCT Filed: Apr. 18, 2006

(86) PCT No.: PCT/CN2006/000705

§ 371 (c)(1),
(2), (4) Date: May 30, 2007

(87) PCT Pub. No.: WO2006/111077

PCT Pub. Date: Oct. 26, 2006

(65) Prior Publication Data

US 2008/0144514 A1 Jun. 19, 2008

(30) Foreign Application Priority Data

Apr. 19, 2005 (CN) .................. 2005 1 0067121

(51) Int. Cl.
*H04L 12/28* (2006.01)
*H04J 3/26* (2006.01)
*H04J 3/24* (2006.01)
(52) U.S. Cl. ...................... 370/254; 370/475
(58) Field of Classification Search .............. 370/241.1, 370/254, 312, 390, 432, 475
See application file for complete search history.

(56) References Cited

U.S. PATENT DOCUMENTS 5,633,869 A * 5/1997 Burnett et al. .............. 370/396

(Continued)

FOREIGN PATENT DOCUMENTS

WO WO2004098152 A1 11/2004

OTHER PUBLICATIONS

Tanenbaum, A.S. "The Address Resolution Protocol" *Computer Networks*, London: Prentice-Hall International, GB, (1996), pp. 420-424.

(Continued)

*Primary Examiner*—Kevin C Harper
*Assistant Examiner*—Xavier Szewai Wong
(74) *Attorney, Agent, or Firm*—Ladas and Parry LLP (57) ABSTRACT

A method for making correspondence between an MPID (Maintenance Point Identifier) and a MAC (Media Access Control) address, including: each MP (Maintenance Point) on the network is allocated a unique MPID at first; to obtain the MAC address of a destination MP, a MEP (Maintenance End Point) sends a broadcast query message to all the MPs on the network with the MPID of the destination MP; after receiving the broadcast query message, each MP determines whether the MPID in the message is the same as its MPID; if they are same, returns a unicast response message which includes the MPID and the MAC address; otherwise, no operation is performed; the MEP obtains the MAC address of the destination MP from the received unicast response message. The invention overcomes the problem of the prior art that an MEP cannot know the MAC address of a destination MP. By the present invention, various functions of the OAM can be accomplished and the uniqueness of the MPID and the MAC address of an MP on the network may also be ensured.

20 Claims, 2 Drawing Sheets

U.S. PATENT DOCUMENTS

| | | | |
|---|---|---|---|
| 5,781,552 A * | 7/1998 | Hashimoto | 370/447 |
| 6,643,289 B1 * | 11/2003 | Natanson et al. | 370/395.2 |
| 6,950,431 B1 * | 9/2005 | Nozaki et al. | 370/390 |
| 7,058,023 B2 * | 6/2006 | Wynn | 370/254 |
| 7,116,672 B1 * | 10/2006 | Sivakumar | 370/395.4 |
| 7,546,126 B2 * | 6/2009 | Beasley et al. | 455/436 |
| 2003/0112765 A1 * | 6/2003 | Gaspard et al. | 370/252 |
| 2004/0160969 A1 * | 8/2004 | Moon et al. | 370/401 |
| 2004/0165595 A1 * | 8/2004 | Holmgren et al. | 370/395.3 |
| 2004/0213237 A1 | 10/2004 | Yasue et al. | |
| 2005/0099954 A1 * | 5/2005 | Mohan et al. | 370/241.1 |
| 2005/0198383 A1 * | 9/2005 | Rose et al. | 709/245 |
| 2005/0232272 A1 * | 10/2005 | Deng | 370/390 |
| 2006/0159032 A1 * | 7/2006 | Ukrainetz et al. | 370/254 |
| 2006/0187928 A1 * | 8/2006 | McGee et al. | 370/390 |
| 2008/0165772 A1 * | 7/2008 | Kobayashi | 370/390 |

OTHER PUBLICATIONS

English Abstract of CN1486037 Published Mar. 31, 2004.
English Abstract of KR20050000222 Published Jan. 3, 2005.

* cited by examiner

METHOD FOR MAKING CORRESPONDENCE BETWEEN A MAINTENANCE POINT IDENTIFIER AND A MEDIA ACCESS CONTROL ADDRESS

CROSS REFERENCES TO RELATED APPLICATIONS

This application is a National Stage entry under 35 U.S.C. 371 of International Application No. PCT/CN2006/000705, filed Apr. 18, 2006, which claims priority to Chinese Patent Application No. 200510067121.9, filed Apr. 19, 2005.

FIELD OF THE INVENTION

The present invention relates to network communication technology, in particular, to a method for making correspondence between a MPID (maintenance point identifier) and a MAC (media access control) address in the network communication technology.

BACKGROUND OF THE INVENTION

With the development of Ethernet, service providers pay more and more attention to the maintainability of devices. As Ethernet expands to MAN (metropolitan area network) and WAN (wide area network), various problems about the transport network need to be solved. Most of the problems about the transport network may be solved via Operation, Administration and Maintenance (OAM) functions. The Ethernet OAM mainly includes:

1. The automatic detection of a failure. The detection of a failure may be accomplished by connectivity check (CC). Specifically, during CC, a source node sends a CC frame, i.e. a CC message, to a destination node periodically, and the destination node periodically receives the CC message; and if the destination node does not receive the CC message from the source node after a period of time, it will give an alarm. The connectivity and continuity of a link are checked by checking CC messages, so that the object of end-to-end automatic detection of failures may be attained.

2. Positioning of a failure. The positioning of a failure may be accomplished via loop back (LB). Specifically, during LB, after a source node sends a loop back message to a destination node, it waits for a loop back response from the destination node; if no loop back response from the destination node is received in a specific time period, it will give an alarm. A failure point is positioned mainly by such a two-way connectivity check.

3. The isolation of a failure. During link tracing (LT), a source node sends an LT message manually, and after a MIP (maintenance intermediate point) receives the message, it returns a response to the source node, and forwards the message to downstream nodes at the same time until it reaches the destination node. As a result, the topological structure of the link may be discovered, so that a failure may be isolated according to the topological structure of the link.

The reliability of the network can be improved by the above-mentioned three functions of OAM, thus the maintainability of the network can be enhanced.

In the above three functions, all source nodes need to send unicast message to destination nodes according to the MAC address of each destination node. Wherein, the source node and the destination node both belong to an MP (maintenance point), which includes a MIP (maintenance intermediate point) and a MEP (maintenance end point); the source node can only be a MEP, while the destination point can be a MIP or a MEP.

If a source node does not know the MAC address of a destination node, it cannot send a unicast message to the destination node. However, the OAM proposals only puts forward that an identifier should be allocated to a MP, but not point out how each MP can obtain the MAC addresses of other Mps.

SUMMARY OF THE INVENTION

In view of the above problems, the embodiments of the present invention are to provide a method for making correspondence between a MPID (maintenance point identifier) and a MAC (media access control) address, by means of which a source node may obtain the corresponding MAC address according to the MPIDs of other MPs (maintenance points), so that the source node may send a unicast message to a destination node and various functions of OAM may be accomplished.

The invention may be realized by the following solutions.

A method for making correspondence between a MPID and a MAC address, in which each MP in the network is allocated a unique MPID, the method further comprises:

sending, by a MEP (maintenance end point), a broadcast query message to all the MPs on the network with the MPID of a destination MP obtain the MAC address of the destination MP;

determining, by the MPs, whether the MPID in the message is the same as its MPID after each MP receives the broadcast query message; and if they are same, then returning a unicast response message which includes its own MPID and MAC address; otherwise, performing no operation; and obtaining, by the MEP, the MAC address of the destination MP from the received unicast response message.

The step of obtaining the media access control address of the destination maintenance point from the received unicast response message further comprises: saving, by the MEP, the obtained correspondence between the MPID and the MAC address in its correspondence information table set in each maintenance end point on the network for saving the correspondence between the maintenance point identifier and the media access control address.

The method may further comprise:

sending, by an MP newly entered the network, to other MPs on the network a broadcast configuration message, which carries the MPID and the MAC address of the MP newly entered; and saving, by a MEP on the network which receives the broadcast configuration message, the correspondence between the MPID and the MAC address in the broadcast configuration message in its own correspondence information table.

The method may further comprise:

determining, by an MP on the network which receives the broadcast configuration message, whether the MP newly entered is a MEP; and if Not, then ending the process; otherwise, returning a unicast response message, which includes the MPID and the MAC address of the current MP, to the MP newly entered;

after the MP newly entered receives the unicast response message, updating the correspondence information table saved in itself according to the MPID and MAC address in the unicast response message.

Before the MP newly entered sends a broadcast configuration message, the method further comprises: verifying the validity of the MP newly entered; if it is valid, then executing the step of sending a broadcast configuration message and its subsequent steps; otherwise, ending the process.

The process of verifying the validity of the MP newly entered comprises:

sending, by the MP newly entered, a broadcast query message to the network with its MPID, and starting a timer;

determining, by each MP which receives the broadcast query message, whether the MPID carried in the message is the same as its MPID; and if they are same, then returning a unicast response message; otherwise, performing no operation; and determining, by the MP newly entered, whether the unicast response message from other MP is received before the timer times out; and if it is received, then determining that the MP newly entered is invalid; otherwise, determining that the MP newly entered is valid.

After the MP newly entered is determined as valid, the method further comprises: periodically sending a broadcast query message to the network; if no unicast response message is received before the timer which corresponds to the broadcast query message sent this time times out, then determining that the MP newly entered is valid; otherwise, determining that the MP newly entered is invalid.

The method may further comprise:

sending, by the MP, a broadcast quit message which carries the MPID or further the MAC address information of the MP, to other MPs on the network when the MP exits the network; and deleting, by a MEP on the network which receives the message, the correspondence between the MPID and the MAC address in the message from the correspondence information table saved therein.

The method may further comprise:

setting a living timer for each record in the correspondence information table saved in the MEP, and sending a unicast query message to the MPs on the network with the MPID and the MAC address in the record as parameters and starting an living response timer when the living timer times out;

returning the corresponding unicast response message by the MP which receives the unicast query message; and if the MEP does not receive the unicast response message before the living response timer times out, then deleting the record and the corresponding living timer and the living response timer; otherwise, preserving the record and resetting the living timer and the living response timer.

The method may further comprise:

setting a living timer for each record in the correspondence information table saved in the MEP, and sending a broadcast query message to the MPs on the network with the MPID of the record as a parameter and starting the living response timer when the living timer times out;

returning, by the MP which receives the broadcast query message, the corresponding unicast response message, which carries the MPID and the MAC address of the MP; and deleting, by the MEP, the record and the corresponding living timer and the living response timer if the MEP does not receive the unicast response message before the living response timer times out; and determining whether the MAC address in the unicast response message is the same as that in the record if the unicast response message is received, if they are same, then preserving the record and resetting the living timer and the living response timer, otherwise, replacing the MAC address in the record with the MAC address in the unicast response message and resetting the living timer and the living response timer.

According to an embodiment of the present invention, a MAC address corresponding to the MPID of a destination MP may be obtained automatically; as a result, various functions of OAM may be accomplished.

Additionally, according to an embodiment of the present invention, the uniqueness of the MPID configured for an MP on a network may also be ensured.

DETAILED DESCRIPTION OF THE EMBODIMENTS

In order to better understand and realize the present invention by those skilled in the art, embodiments of the present invention will now be described in conjunction with the drawings.

For the convenience of network administration, each MP (maintenance point) on the network may be allocated a unique MPID (maintenance point identifier) when the network is disposed. The unique MPID may be allocated automatically by the network or may be configured manually. An MP comprises a MEP (maintenance end point) and a MIP (maintenance intermediate point), and only the MEP needs to send a unicast message actively and the MIP needs to return a response message corresponding to the received message, so only the MEP needs to know the MAC (media access control) addresses of other MPs.

Figure 1:
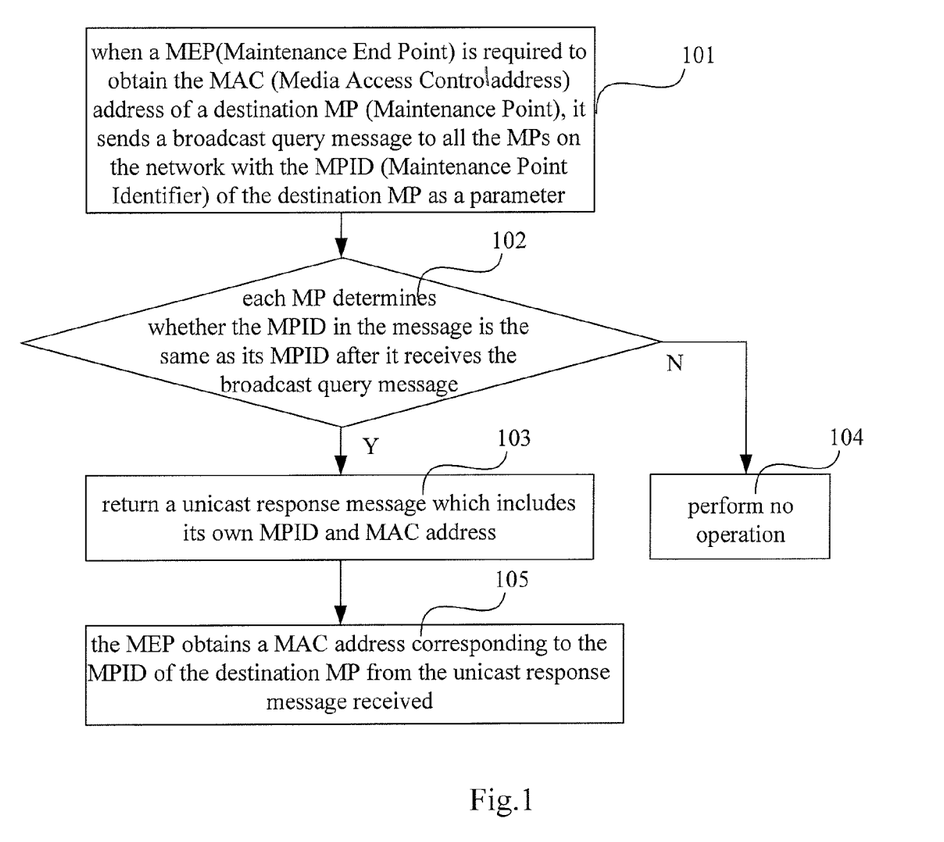
FIG. 1 is a flow chart showing the solution according to an embodiment of the present invention.

The process according to an embodiment of the present invention is shown in FIG. 1, which comprises the following steps.

Step 101: a MEP sends a broadcast query message to all the MPs on the network with the MPID of the destination MP as a parameter to obtain the MAC address of a destination MP.

Step 102 to 104: each MP determines whether the MPID in the message is the same as its MPID after it receives the broadcast query message; if they are same, returns a unicast response message which includes its MPID and MAC address; otherwise, no operation is performed.

Step 105: the MEP obtains a MAC address corresponding to the MPID of the destination MP from the unicast response message received.

By means of the above steps, correspondence may be made between the MPID and the MAC address.

When a broadcast query message is sent by a MEP, a timer may be started at the same time. If a unicast response message is received before the timer times out, turn to Step 105 and stop the timer; if no unicast response message is received even after the timer times out, it indicates that no MP corresponding to the MPID exists on the network and error handling may be performed.

In the flow chart shown in FIG. 1, the MEP performs the above process each time when the MAC address of a destination MP needs to be obtained. This is troublesome. So an embodiment of the invention further provides a solution to save MAC address in a MEP.

The detailed solution is as follows. At first, a correspondence information table is set in each MEP for saving the correspondence between the MPID and the MAC address. Then, in the above Step 105, after the MEP obtains the MAC address of a destination MEP, it may save the correspondence between the MAC address and the MPID in its correspondence information table. Thus, when the MEP needs to send a unicast message to the destination MP for the next time, it may look up for the corresponding MAC address in the correspondence information table directly according to the MPID of the destination MP.

Additionally, because MP often enters/exits the network, if a correspondence information table is set for a MEP, other MEPs may be informed to add/delete a record corresponding to the MP to/from the correspondence information table when the MP enters/exits, that is, the correspondence between the MPID and the MAC address of the MP. Wherein, the MP entered/quitted may be a MEP or a MIP.

The case that an MP enters will be described first. The corresponding technical solution comprises the following steps.

Step a: the MP configures its MPID and MAC address as a broadcast configuration message, and broadcasts the broadcast configuration message to other MPs on the network.

Step b: after a MEP on the network receives the broadcast configuration message, it updates the record in the correspondence information table saved in itself with the MPID and MAC address in the broadcast configuration message.

Additionally, the MP newly entered may also be a MEP. If it is a MEP, the correspondence between the MPID and the MAC address of each MP also needs to be saved. In such a case, the flow chart of the solution according to an embodiment of the present invention is shown as in FIG. 2, which comprises the following steps.

Figure 2:
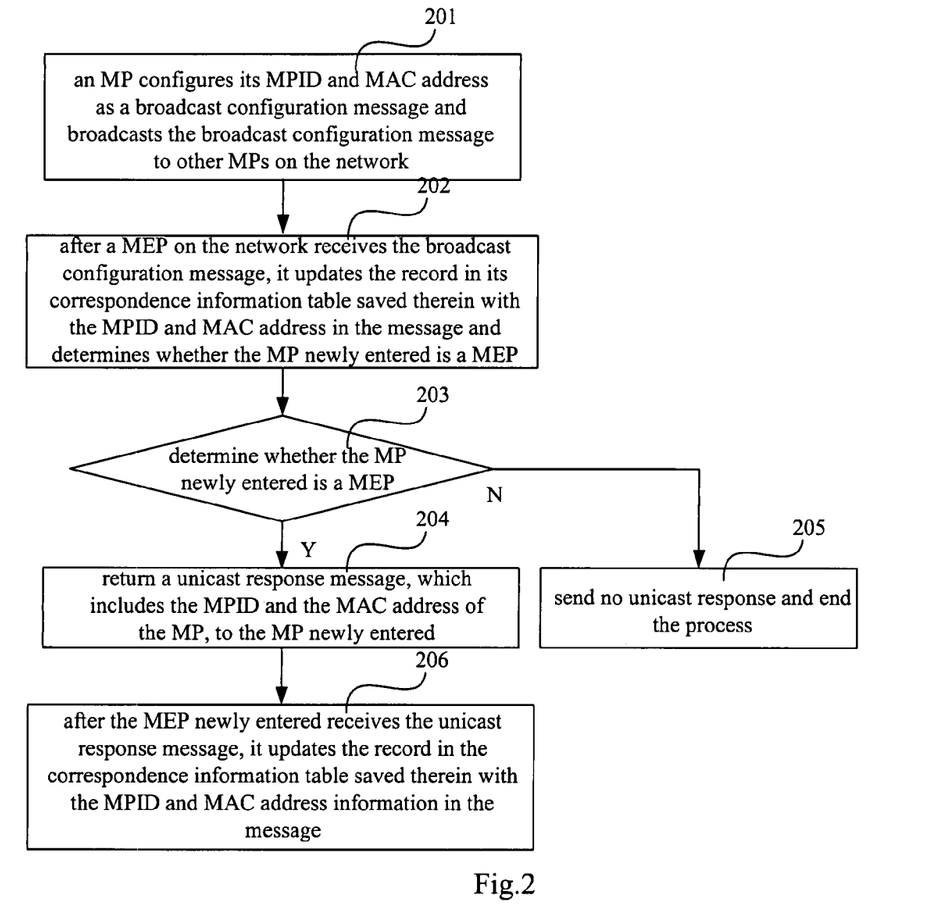
FIG. 2 is a flow chart showing the process when an MP newly enters a network according to an embodiment of the invention.

Step 201: an MP newly entered configures its MPID and MAC address as a broadcast configuration message, and broadcasts the broadcast configuration message to other MPs on the network.

Step 202 to 205, after a MEP on the network receives the broadcast configuration message, it updates the record in its correspondence information table saved in itself with the MPID and MAC address in the message and determines whether the MP newly entered is an MEP; if it is an MEP, returns a unicast response message which includes the MPID and the MAC address of the MP, to the MP newly entered, and turns to Step 206; otherwise, no unicast response is sent, and the process ends.

In the above Step 203, the MEP determines whether the MP newly entered is a MEP. If the newly entered MEP is further required to record the correspondence between the MPID and the MAC address of the MIP, then in Step 203, all the MPs which receive the broadcast configuration message determine whether the MP newly entered is a MEP, and the subsequent Step 204 and Step 206 or Step 205 may be performed according to the determination result.

Step 206: after the MEP newly entered receives the unicast response message, it updates the record in the correspondence information table saved in itself with the MPID and MAC address information in the message.

As a result, correspondence between the MPID and the MAC address may be accomplished by the above process.

Additionally, according to an embodiment of the present invention, although it is needed to set a unique MPID for each MP, repeated MPIDs may appear in practical allocation. Once the repeated MPIDs appear, the OAM functions of the whole network may be affected. Therefore, to avoid allocating repeated MPIDs, before the MP newly entered performs the above process, a step of verifying whether an MP newly entered is valid may be further performed; if it is valid, the corresponding process may be performed. The process of verifying whether an MP newly entered is valid comprises the following steps.

Step A: firstly, the MP newly entered sends a broadcast query message to the network with its MPID as a parameter and starts a timer. The step length of the timer may be set as required.

After other MPs on the network receive the broadcast query message, they query whether the MPID carried in the message is the same as their MPIDs; if they are same, return a unicast response message and the MP newly entered is determined as an invalid MP; otherwise, no operation will be performed.

Step B: if an MP newly entered receives a unicast response message from another MP on the network before the timer times out, it determines that its MPID is the same as the MPID of said another MP, and the MP is determined as invalid, thereby the process ends; if no unicast response message is received till the timer times out, the MP is determined as valid, then Step A and Step B or the steps in FIG. 2 may be performed.

In the above Step B, if an MP newly entered does not receive a unicast response message, the MP may be regarded as valid. Actually, due to the disconnection of the current network, the MP with the same MPID as that of the MP newly entered may not be found and thus the MP newly entered will be regarded as valid. In such a case, if the network is connected, two MPs with the same MPID may appear, which is obviously not allowed.

To solve this problem, an MP newly entered may periodically send a broadcast query message to the network. If a unicast response message is received, it is determined that the MP is invalid and the network may perform the corresponding processing after the MP is determined as invalid, so that the OAM functions will not be affected; otherwise, the MP may be regarded as valid.

An MP may also exit the network instead of entering the network. In such a case, an MP which wants to exit may configure a broadcast quit message with its MPID as a parameter and broadcast the message to other MPs on the network. The MEP on the network which receives the broadcast quit message extracts the MPID from the broadcast quit message, and then deletes the correspondence information between the MAC address and the MPID corresponding to the MPID from the correspondence information table saved in itself. However, the broadcast quit message may further take the MAC address as a parameter; therefore, the MEP which receives the broadcast quit message may also look up for the record in the correspondence information table according to the MAC address.

Based on the above solution, if the property of an MP needs to be modified, for example, if an MPID and/or an MAC address need to be modified, the MP may exit the network at first. At this moment, the correspondence information of the MP saved in other MEPs may be deleted via a broadcast quit message. Then, after the property of the MP is modified, the MP may enter the network again. At this moment, the correspondence information of the MP may be saved in other MEPs via a broadcast configuration message. As a result, the correspondence information table in each MEP may be updated.

Additionally, according to an embodiment of the present invention, the MEP may apply a timeout mechanism to the record in the correspondence information table saved therein, that is, a timer starts for each record as the record begins. After a period of time, for example, the period of time may be A, which can be configured as required, a broadcast query message or a unicast query message will be sent to the MP in the record. And after a period of time, for example, the period of time may be B, which may be configured as required, if no unicast response from a destination MP is received, the destination MP may be regarded as aged and the record may be deleted, together with the timer.

Specifically, a living timer may be set for each record in the correspondence information table. When the living timer times out, a unicast query message will be sent to the network with the MPID and the MAC address of the record as parameters, and at the same time an living response timer will be started. If the living response timer times out and no unicast response message is received, then the destination MP may be regarded as aged, and the record may be deleted, together with the living timer and the living response timer.

There may also be a case in which an MP to be queried still exists while its MAC address changes. In such a case, if a unicast query message is sent, the MP cannot receive the message, so no unicast response message will be returned. As a result, although the MP queried still exists, since its MAC address is changed, the MEP would also delete its corresponding record. It is relatively troublesome and is inconvenient for the interaction between the MPs.

In view of the above case, the MEP may also be set to send a broadcast query message to all the MPs on the network with the MPID queried as a parameter when the living timer times out. Thus, all the MPs on the network may receive the message, so that a unicast response message may be returned even if the MAC address of the MP changes. After the MEP receives the unicast response message, it determines whether the MAC address in the unicast response message is the same as the MAC address in the record; if they are same, preserve the record; otherwise, replace the MAC address in the record with the MAC address in the unicast response message.

It can be seen from the above description, an MP may automatically obtain the MAC addresses of other MPs according to an embodiment of the present invention, and therefore various OAM functions may be accomplished. Additionally, according to an embodiment of the present invention, the uniqueness of an MPID set in an MP on the network may also be ensured.

While the present invention has been illustrated and described with reference to some preferred embodiments, the present invention is not limited to these. Those skilled in the art should recognize that various variations and modifications can be made without departing from the spirit and scope of the present invention as defined by the accompanying claims.

What is claimed is:

1. A method for making correspondence between a maintenance point identifier and a media access control address, wherein each maintenance point on the network is allocated a unique maintenance point identifier, the method further comprising:

sending, by a maintenance end point, a broadcast query message to all the maintenance points on the network with a maintenance point identifier of a destination maintenance point to obtain the media access control address of the destination maintenance point;

determining, by the maintenance points, whether the maintenance point identifier in the message is the same as its own maintenance point identifier after each maintenance point receives the broadcast query message; if they are same, returning a unicast response message which includes its own maintenance point identifier and media access control address; otherwise, performing no operation;

obtaining, by the maintenance end point, the media access control address of the destination maintenance point from the unicast response message;

sending, by a maintenance point newly entered the network, to other maintenance points on the network a broadcast configuration message which carries the maintenance point identifier and the media access control address of the maintenance point newly entered; and saving, by a maintenance end point on the network which receives the broadcast configuration message, the correspondence between the maintenance point identifier and the media access control address in the broadcast configuration message in its own correspondence information table;

wherein, before the maintenance point newly entered sends a broadcast configuration message, the method further comprises: verifying the validity of the maintenance point newly entered; if it is valid, executing the step of sending a broadcast configuration message and subsequent steps; otherwise, ending the process;

and the step of verifying the validity of the maintenance point newly entered comprises:

sending, by the maintenance point newly entered, a broadcast query message to the network with its maintenance point identifier and starting a timer;

determining, by each maintenance point which receives the broadcast query message, whether the maintenance point identifier carried in the message is the same as its own maintenance point identifier; if they are same, then returning a unicast response message; otherwise, performing no operation; and determining, by the maintenance point newly entered, whether the unicast response message from other maintenance point is received before the timer times out; and if it is received, determining that the maintenance point newly entered is invalid; otherwise, determining that the maintenance point newly entered is valid.

2. The method according to claim 1, wherein the step of obtaining the media access control address of the destination maintenance point from the unicast response message further comprises: saving, by the maintenance end point, the obtained correspondence between the maintenance point identifier and the media access control address in its correspondence information table set in each maintenance end point on the network for saving the correspondence between the maintenance point identifier and the media access control address.

3. The method according to claim 2, wherein the method further comprises:

sending, by the maintenance point, a broadcast quit message which carries the maintenance point identifier or further the media access control address information of the maintenance point, to other maintenance points on the network when the maintenance point exits the network; and deleting, by an maintenance end point on the network which receives the message, the correspondence between the maintenance point identifier and the media access control address in the message from the correspondence information table saved therein.

4. The method according to claim 3, wherein the method further comprises:

setting a living timer for each record in the correspondence information table saved in the maintenance end point, and sending a unicast query message to the maintenance points on the network with the maintenance point identifier and the media access control address in the record as parameters and starting a living response timer when the living timer times out;

returning a corresponding unicast response message by the maintenance point which receives the unicast query message; and if the maintenance end point does not receive the unicast response message before the living response timer times out, deleting the record and the corresponding living timer and the living response timer; otherwise, preserving the record and resetting the living timer and the living response timer.

5. The method according to claim 3, wherein the method further comprises:

setting a living timer for each record in the correspondence information table saved in the maintenance end point, and sending a broadcast query message to the maintenance points on the network with the maintenance point identifier of the record as a parameter and starting a living response timer when the living timer times out;

returning, by the maintenance point which receives the broadcast query message, a corresponding unicast response message, which carries the maintenance point identifier and the media access control address of the maintenance point; and deleting, by the maintenance end point, the record and the corresponding living timer and the living response timer if the maintenance end point does not receive the unicast response message before the living response timer times out; and determining whether the media access control address in the unicast response message is the same as that in the record if the unicast response message is received; if they are same, then preserving the record and resetting the living timer and the living response timer, otherwise, replacing the media access control address in the record with the media access control address in the unicast response message and resetting the living timer and the living response timer.

6. The method according to claim 2, wherein the method further comprises:

setting a living timer for each record in the correspondence information table saved in the maintenance end point, and sending a unicast query message to the maintenance points on the network with the maintenance point identifier and the media access control address in the record as parameters and starting a living response timer when the living timer times out;

returning a corresponding unicast response message by the maintenance point which receives the unicast query message; and if the maintenance end point does not receive the unicast response message before the living response timer times out, deleting the record and the corresponding living timer and the living response timer; otherwise, preserving the record and resetting the living timer and the living response timer.

7. The method according to claim 2, wherein the method further comprises:

setting a living timer for each record in the correspondence information table saved in the maintenance end point, and sending a broadcast query message to the maintenance points on the network with the maintenance point identifier of the record as a parameter and starting a living response timer when the living timer times out;

returning, by the maintenance point which receives the broadcast query message, a corresponding unicast response message, which carries the maintenance point identifier and the media access control address of the maintenance point; and deleting, by the maintenance end point, the record and the corresponding living timer and the living response timer if the maintenance end point does not receive the unicast response message before the living response timer times out; and determining whether the media access control address in the unicast response message is the same as that in the record if the unicast response message is received; if they are same, then preserving the record and resetting the living timer and the living response timer, otherwise, replacing the media access control address in the record with the media access control address in the unicast response message and resetting the living timer and the living response timer.

8. The method according to claim 1, wherein the method further comprises:

determining, by a maintenance point on the network which receives the broadcast configuration message, whether the maintenance point newly entered is a maintenance end point; if not, the process ends; otherwise, returning a unicast response message which includes the maintenance point identifier and the media access control address of the current maintenance point, to the maintenance point newly entered; and after the maintenance point newly entered receives the unicast response message, updating the correspondence information table saved in itself according to the maintenance point identifier and media access control address in the unicast response message.

9. The method according to claim 8, wherein the method further comprises:

setting a living timer for each record in the correspondence information table saved in the maintenance end point, and sending a unicast query message to the maintenance points on the network with the maintenance point identifier and the media access control address in the record as parameters and starting a living response timer when the living timer times out;

returning a corresponding unicast response message by the maintenance point which receives the unicast query message; and if the maintenance end point does not receive the unicast response message before the living response timer times out, deleting the record and the corresponding living timer and the living response timer; otherwise, preserving the record and resetting the living timer and the living response timer.

10. The method according to claim 8, wherein the method further comprises:

setting a living timer for each record in the correspondence information table saved in the maintenance end point, and sending a broadcast query message to the maintenance points on the network with the maintenance point identifier of the record as a parameter and starting a living response timer when the living timer times out;

returning, by the maintenance point which receives the broadcast query message, a corresponding unicast response message, which carries the maintenance point identifier and the media access control address of the maintenance point; and deleting, by the maintenance end point, the record and the corresponding living timer and the living response timer if the maintenance end point does not receive the unicast response message before the living response timer times out; and determining whether the media access control address in the unicast response message is the same as that in the record if the unicast response message is received; if they are same, then preserving the record and resetting the living timer and the living response timer, otherwise, replacing the media access control address in the record with the media access control address in the unicast response message and resetting the living timer and the living response timer.

11. The method according to claim 1, wherein, after the maintenance point newly entered is determined as valid, the method further comprises: periodically sending a broadcast query message to the network; if no unicast response message is received before the timer which corresponds to the broadcast query message sent this time times out, determining that the maintenance point newly entered is valid; otherwise, determining that the maintenance point newly entered is invalid.

12. The method according to claim 11, wherein the method further comprises:
setting a living timer for each record in the correspondence information table saved in the maintenance end point, and sending a unicast query message to the maintenance points on the network with the maintenance point identifier and the media access control address in the record as parameters and starting a living response timer when the living timer times out;
returning a corresponding unicast response message by the maintenance point which receives the unicast query message; and
if the maintenance end point does not receive the unicast response message before the living response timer times out, deleting the record and the corresponding living timer and the living response timer; otherwise, preserving the record and resetting the living timer and the living response timer.

13. The method according to claim 11, wherein the method further comprises:
setting a living timer for each record in the correspondence information table saved in the maintenance end point, and sending a broadcast query message to the maintenance points on the network with the maintenance point identifier of the record as a parameter and starting a living response timer when the living timer times out;
returning, by the maintenance point which receives the broadcast query message, a corresponding unicast response message, which carries the maintenance point identifier and the media access control address of the maintenance point; and
deleting, by the maintenance end point, the record and the corresponding living timer and the living response timer if the maintenance end point does not receive the unicast response message before the living response timer times out; and determining whether the media access control address in the unicast response message is the same as that in the record if the unicast response message is received; if they are same, then preserving the record and resetting the living timer and the living response timer, otherwise, replacing the media access control address in the record with the media access control address in the unicast response message and resetting the living timer and the living response timer.

14. The method according to claim 1, wherein the method further comprises:
setting a living timer for each record in the correspondence information table saved in the maintenance end point, and sending a unicast query message to the maintenance points on the network with the maintenance point identifier and the media access control address in the record as parameters and starting a living response timer when the living timer times out;
returning a corresponding unicast response message by the maintenance point which receives the unicast query message; and
if the maintenance end point does not receive the unicast response message before the living response timer times out, deleting the record and the corresponding living timer and the living response timer; otherwise, preserving the record and resetting the living timer and the living response timer.

15. The method according to claim 1 wherein the method further comprises:
setting a living timer for each record in the correspondence information table saved in the maintenance end point, and sending a unicast query message to the maintenance points on the network with the maintenance point identifier and the media access control address in the record as parameters and starting a living response timer when the living timer times out;
returning a corresponding unicast response message by the maintenance point which receives the unicast query message; and
if the maintenance end point does not receive the unicast response message before the living response timer times out, deleting the record and the corresponding living timer and the living response timer; otherwise, preserving the record and resetting the living timer and the living response timer.

16. The method according to claim 1 wherein the method further comprises:
setting a living timer for each record in the correspondence information table saved in the maintenance end point, and sending a unicast query message to the maintenance points on the network with the maintenance point identifier and the media access control address in the record as parameters and starting a living response timer when the living timer times out;
returning a corresponding unicast response message by the maintenance point which receives the unicast query message; and
if the maintenance end point does not receive the unicast response message before the living response timer times out, deleting the record and the corresponding living timer and the living response timer; otherwise, preserving the record and resetting the living timer and the living response timer.

17. The method according to claim 1, wherein the method further comprises:
setting a living timer for each record in the correspondence information table saved in the maintenance end point, and sending a broadcast query message to the maintenance points on the network with the maintenance point identifier of the record as a parameter and starting a living response timer when the living timer times out;
returning, by the maintenance point which receives the broadcast query message, a corresponding unicast response message, which carries the maintenance point identifier and the media access control address of the maintenance point; and
deleting, by the maintenance end point, the record and the corresponding living timer and the living response timer if the maintenance end point does not receive the unicast response message before the living response timer times out; and determining whether the media access control address in the unicast response message is the same as that in the record if the unicast response message is received; if they are same, then preserving the record and resetting the living timer and the living response timer, otherwise, replacing the media access control address in the record with the media access control address in the unicast response message and resetting the living timer and the living response timer.

18. The method according to claim 1, wherein the method further comprises:

setting a living timer for each record in the correspondence information table saved in the maintenance end point, and sending a broadcast query message to the maintenance points on the network with the maintenance point identifier of the record as a parameter and starting a living response timer when the living timer times out;

returning, by the maintenance point which receives the broadcast query message, a corresponding unicast response message, which carries the maintenance point identifier and the media access control address of the maintenance point; and deleting, by the maintenance end point, the record and the corresponding living timer and the living response timer if the maintenance end point does not receive the unicast response message before the living response timer times out; and determining whether the media access control address in the unicast response message is the same as that in the record if the unicast response message is received; if they are same, then preserving the record and resetting the living timer and the living response timer, otherwise, replacing the media access control address in the record with the media access control address in the unicast response message and resetting the living timer and the living response timer.

19. The method according to claim 1, wherein the method further comprises:

setting a living timer for each record in the correspondence information table saved in the maintenance end point, and sending a broadcast query message to the maintenance points on the network with the maintenance point identifier of the record as a parameter and starting a living response timer when the living timer times out;

returning, by the maintenance point which receives the broadcast query message, a corresponding unicast response message, which carries the maintenance point identifier and the media access control address of the maintenance point; and deleting, by the maintenance end point, the record and the corresponding living timer and the living response timer if the maintenance end point does not receive the unicast response message before the living response timer times out; and determining whether the media access control address in the unicast response message is the same as that in the record if the unicast response message is received; if they are same, then preserving the record and resetting the living timer and the living response timer, otherwise, replacing the media access control address in the record with the media access control address in the unicast response message and resetting the living timer and the living response timer.

20. A method for making correspondence between a maintenance point identifier and a media access control address, wherein each maintenance point on the network is allocated a unique maintenance point identifier, the method further comprises:

sending, by a maintenance end point, a broadcast query message to all the maintenance points on the network with a maintenance point identifier of a destination maintenance point to obtain the media access control address of the destination maintenance point;

determining, by the maintenance points, whether the maintenance point identifier in the message is the same as its own maintenance point identifier after each maintenance point receives the broadcast query message; if they are same, returning a unicast response message which includes its own maintenance point identifier and media access control address; otherwise, performing no operation;

obtaining, by the maintenance end point, the media access control address of the destination maintenance point from the unicast response message;

sending, by a maintenance point newly entered the network, to other maintenance points on the network a broadcast configuration message which carries the maintenance point identifier and the media access control address of the maintenance point newly entered; and saving, by a maintenance end point on the network which receives the broadcast configuration message, the correspondence between the maintenance point identifier and the media access control address in the broadcast configuration message in its own correspondence information table;

wherein the step of obtaining the media access control address of the destination maintenance point from the unicast response message further comprises: saving, by the maintenance end point, the obtained correspondence between the maintenance point identifier and the media access control address in its correspondence information table set in each maintenance end point on the network for saving the correspondence between the maintenance point identifier and the media access control address wherein, before the maintenance point newly entered sends a broadcast configuration message, the method further comprises: verifying the validity of the maintenance point newly entered; if it is valid, executing the step of sending a broadcast configuration message and subsequent steps; otherwise, ending the process;

and the step of verifying the validity of the maintenance point newly entered comprises:

sending, by the maintenance point newly entered, a broadcast query message to the network with its maintenance point identifier and starting a timer;

determining, by each maintenance point which receives the broadcast query message, whether the maintenance point identifier carried in the message is the same as its own maintenance point identifier; if they are same, then returning a unicast response message; otherwise, performing no operation; and determining, by the maintenance point newly entered, whether the unicast response message from other maintenance point is received before the timer times out; and if it is received, determining that the maintenance point newly entered is invalid; otherwise, determining that the maintenance point newly entered is valid.

\* \* \* \* \*